Patented June 21, 1932

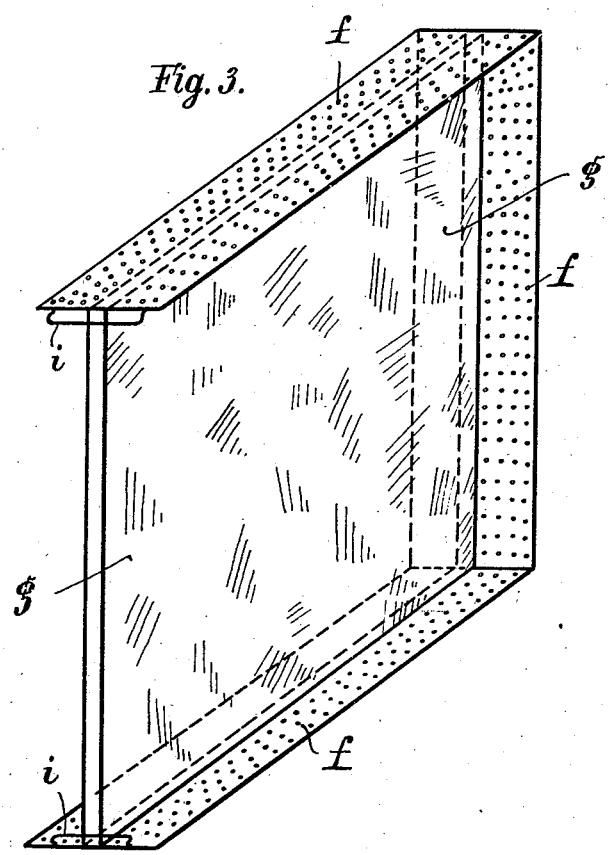

1,864,237

UNITED STATES PATENT OFFICE

PHILIPP LORENZ FAUTH, OF WIESBADEN, GERMANY

EXTRACTING AND FILTERING APPARATUS

Application filed October 30, 1931, Serial No. 572,200, and in Germany November 14, 1930.

This invention relates to extracting and filtering apparatus, and is concerned more particularly with apparatus for the filtration of oil containing fuller's earth in which the filtration, extraction of the cake and expulsion of the solvent are consecutively effected in one operation. Such apparatus may be used f. i. as miscella filters, the filter cake formed being in this case also extracted in one operation with the filtration and subsequent expulsion of the solvent.

This invention concerns a particularly efficient form of this kind of apparatus, in which filtration may be effected, if desired, with fibrous asbestos, which is introduced into the liquid to be filtered, and replaces the cloths generally used. In this case the filter elements are covered with fine wire gauze.

The object of the invention is to provide extracting and filtering apparatus which comprises a hollow body of substantially cubic form closed in front by means of a hinged door secured by screws in known manner. The two side walls are each provided with a heating jacket, and from the back wall provided with similar heating means, heating members in the form of elongated pockets extend at a predetermined distance from one another to the front wall or door, the intervening spaces thus forming filter chambers capable of being heated. The said heating members are disposed parallel or conically to one another.

Suitable sieve plate frames which are open in front and at the sides and carry the actual filter elements, are inserted in the aforesaid filter chambers. These sieve plate frames are movably disposed on ledges projecting on each side from the bottom of the filter chambers.

The outlets from the filter elements discharge in front in known manner into collecting pipes and are held in position by readily removable ring or eccentric fasteners.

The sieve plate frames serve to distribute the liquid uniformly in the filter chambers and enable emptying to be readily effected owing to the fact that the filter cakes can be completely and rapidly removed by drawing out the sieve frames.

The filtrate-discharge connections are disposed in the extension of the above-mentioned collecting pipes, whilst the liquid inlets are situated on the bottom and on the cover. Two connections are provided for withdrawing the solvent vapours and evacuating the apparatus respectively.

Figure 1:
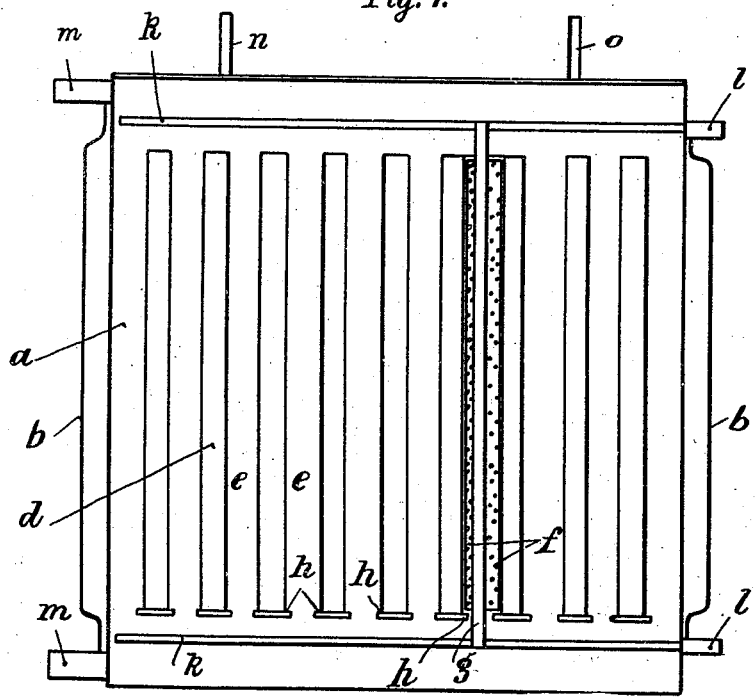
Figure 2:
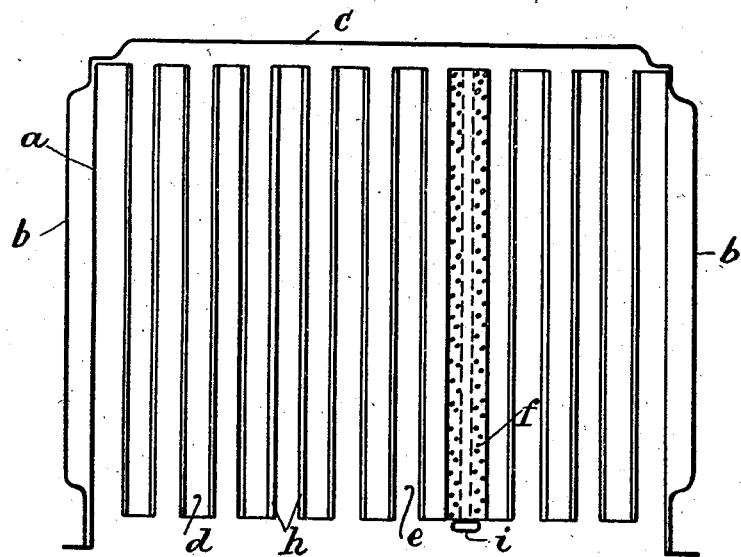

The invention is illustrated by way of example in the accompanying drawings, in which Figure 1 is a front elevation of the apparatus with the door removed, Figure 2 is a top elevation into the interior of Figure 1, and Figure 3 shows one individual sieve plate frame.

The side walls $b$, $b$ and the rear wall $c$ of the container are each provided with a heating jacket. From the rear wall $c$ heating members in the form of elongated pockets $d$ project into the interior of the container in such a way that the intervening spaces form individual chambers $e$. The sieve frames $f$ are inserted from the front into the chamber $e$ between the heating pockets $d$ and are guided and kept in position by the ledges $h$. The sieve frames $f$ are provided in front with handles $i$, $i$. The outlets of the filter elements discharge into the collecting pipes $k$, $k$. $l$, $l$ are the discharge connections for the filtrate, whilst the liquid enters at $m$, $m$. The connection $n$ serves for the removal of the solvent vapours and $o$ is the connection for the means of evacuating the apparatus.

As shown in Figure 3 the sieve plate frame $f$ carries the filter elements or filter frames $g$.

The modus operandi is as follows:—The liquid to be filtered enters at $m$ under suitable pressure, and the filtrate leaves at $l$. As soon as the filtration, for example in the case of oil or miscella containing fuller's earth, has proceeded so far that the filter chambers $e$ are completely filled with cake divided up by the heating elements, the filtration is stopped and immediately thereafter the oil is removed from the filter cake by pumping solvent into the apparatus through the lower inlet opening $m$. The solvent impregnates the cake and passes saturated with oil through the filter elements and collecting pipes and discharges in the form of filtrate from the upper outlet $l$. The upper inlet $m$ and the lower outlet $l$ are closed during the extraction of the filter cake, so that the solvent must penetrate and extract the filter cake uniformly, an almost complete removal of oil being effected in this way. When the extraction is completed steam is admitted into the two side heating jackets and the rear heating jacket. The large heating surface of the heating pockets and the disposition of the filter cakes between the heating surfaces ensure rapid expulsion of the solvent. If desired a vacuum may also be employed. The solvent vapours escape through the discharge connections $n$ to a condenser not shown in the drawings. As soon as the expulsion of the solvent has been effected, the steam is turned off, the front wall or door is opened, and the sieve plate frames are withdrawn together with the filter elements and filter cakes. The filter cakes are loosened by the heat of the walls of the filter chambers, and can be easily removed. The removal of the filter cakes can, if necessary, be still further facilitated by disposing the filter chambers conically to one another. Since the sieve plate frames are open in front, the cakes can be removed simply by tipping the frames over.

What I claim is:—

1. Extracting and filtering apparatus comprising in combination a container, a door closing said container, heating means for the back and side walls of said container, heating pockets extending from the back wall of said container to said door, a sieve frame between said heating pockets and a filter element disposed on said sieve frame.

2. Extracting and filtering apparatus comprising in combination a container, a door closing said container, heating jackets for the back and side walls of said container, entry means for the liquid, discharge means for the filtrate, heating pockets extending from the back wall of said container to said door, interchangeable sieve frames between said heating pockets and filter elements disposed on said interchangeable sieve frames.

3. Extracting and filtering aparatus comprising in combination a container, a door closing said container, heating jackets for the back and side walls of said container, entry means for the liquid, discharge means for the filtrate, means for the removal of solvent vapours, means for evacuating the apparatus, heating pockets extending from the back wall of said container to said door, interchangeable sieve frames between said heating pockets, and filter elements disposed on said interchangeable sieve frames.

In testimony whereof I hereunto affix my signature this 21st day of October, 1931.

PHILIPP LORENZ FAUTH.